United States Patent
Kouda et al.

(10) Patent No.: US 6,825,589 B2
(45) Date of Patent: Nov. 30, 2004

(54) SEQUENTIAL SEGMENT JOINING STATOR COIL TYPE ELECTRIC ROTATING MACHINE

(75) Inventors: Shinji Kouda, Kariya (JP); Masahiro Seguchi, Oobu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/615,957

(22) Filed: Jul. 10, 2003

(65) Prior Publication Data

US 2004/0061402 A1 Apr. 1, 2004

(30) Foreign Application Priority Data

Jul. 15, 2002 (JP) ........................................ 2002-206141

(51) Int. Cl.$^7$ ............................ H02K 3/28; H02K 3/12
(52) U.S. Cl. ................... 310/207; 310/208; 310/201
(58) Field of Search ............................. 310/179, 180, 310/184, 198, 201, 203, 207, 208

(56) References Cited

U.S. PATENT DOCUMENTS

| | | | |
|---|---|---|---|
| 5,376,852 A | * 12/1994 | Kawamura et al. | ......... 310/198 |
| 6,201,332 B1 | 3/2001 | Umeda et al. | |
| 6,373,163 B1 | 4/2002 | Oohashi et al. | |
| 6,501,204 B1 | * 12/2002 | Oohashi et al. | ............. 310/179 |
| 6,515,392 B2 | * 2/2003 | Ooiwa | ......................... 310/179 |
| 6,522,043 B2 | * 2/2003 | Masegi | ....................... 310/180 |
| 6,717,317 B2 | * 4/2004 | Akita et al. | .................. 310/184 |
| 2002/0017825 A1 | 2/2002 | Oohashi et al. | |

FOREIGN PATENT DOCUMENTS

| | | |
|---|---|---|
| JP | A 11-346448 | 12/1999 |
| JP | A 2000-92766 | 3/2000 |
| JP | A 2000-228852 | 8/2000 |
| JP | B1 3155534 | 2/2001 |
| JP | A 2002-58189 | 2/2002 |

* cited by examiner

*Primary Examiner*—Tran Nguyen
(74) *Attorney, Agent, or Firm*—Oliff & Berridge, PLC

(57) ABSTRACT

Provided is a multi-turn sequential segment joining stator coil capable of suppressing the differences in electromotive voltage between parallel circuits and of carrying a large current. Partial coils are accommodated in a plurality of continuous conductor accommodation positions of different slots. The partial coils accommodated in the same slot are separately connected in series to each other to produce parallel coils, and the produced parallel coils are connected in parallel with each other. This configuration enables the production of a sequential segment joining stator coil type electric rotating machine with a size-reduced head-side coil end.

4 Claims, 14 Drawing Sheets

SEQUENTIAL SEGMENT JOINING STATOR COIL TYPE ELECTRIC ROTATING MACHINE

BACKGROUND OF THE INVENTION

1) Field of the Invention

The present invention relates to the improvement of a sequential segment joining stator coil type electric rotating machine (rotary electric machine), and more particularly to the improvement of a vehicle-mounted electric rotating machine of the same type.

2) Description of the Related Art

In the case of an idle stop system which is gradually in employment in the recent years, there is a requirement for starting an engine frequently, and this calls for a brushless type AC motor in place of a brush-needed DC stator. However, a large-starting-current AC motor standing comparison with a conventional DC series starter falls into an increase in size, which requires the enlargement of a space of the engine room or a considerable alteration of the layout therein. One countermeasure against this problem is the division of a stator coil, i.e., the employment of a radial series coil construction.

Meanwhile, as an AC generator for use in vehicles, there has been employed a sequential segment joining stator coil type electric rotating machine which was developed by the Applicant of the present application. This electric rotating machine can provide a simple conductor arranging construction at a coil end portion and can enhance the slot space factor and, hence, achieves size/weight reduction and superior heat radiation of a stator coil, and it is suitable for use as an idle stop AC motor which temporarily requires the supply of a large starting current. However, taking into consideration the employment as a running motor for use in hybrid vehicles, fuel cell powered vehicles or secondary battery powered vehicles, a considerably larger current supply thereto becomes necessary, as compared with a vehicle AD generator with the aforesaid sequential segment joining stator coil.

For the supply of a large current to an electric rotating machine, there have been known various manners including the enlargement of a segment cross section and the division of a stator coil. However, the actual implementation of these manners encounters difficulty on manufacturing. In the meantime, for the enhancement of the output of a vehicle-mounted electric rotating machine and the reduction of the wiring loss, there is also a requirement to handle a high voltage, i.e., for an increase in number of turns. However, in the case of the sequential segment joining stator coil, because of a low degree of freedom on the wiring alteration, difficulty is experienced in accomplishing the employment of a radial series coil construction and the increase in number of turns at the same time. In particular, the simultaneous approach to the increase in number of turns and the increase in number of radial series coils creates various problems, such as complicating the wiring connection construction at a coil end portion.

That is, in the case of a conventional sequential segment joining stator coil, difficulty is encountered in supplying a large current through the use of a parallel circuit arrangement due to a limitation on the segment arrangement pattern and difficulty is experienced in handling a high voltage due to a limitation on the increase in number of turns.

SUMMARY OF THE INVENTION

The present invention has been developed with a view to eliminating these problems, and it is therefore an object of the present invention to provide a sequential segment joining coil with a large-current-supply permitting multi-turn construction, capable of easing the complication of the inter-segment connection pattern and of reducing the variation in electromotive voltage between parallel circuits.

For this purpose, in accordance with a first aspect of the present invention, there is provided a sequential segment joining stator coil type electric rotating machine comprising a rotor having p pairs of poles (where p represents a natural number equal to or more than 2), a stator core including a large number of slots each having s conductor accommodation positions (where s represents an even number equal to or more than 6) in its radial directions, and an armature winding including m-phase windings (where m represents an odd number equal to or more than 3) made by sequentially connecting a large number of U-shaped segments, with each of the U-shaped segments being composed of a U-shaped head portion made to constitute a head-side coil end, a pair of in-slot conductor portions to be respectively accommodated in a pair of slots separated by a predetermined slot pitch from each other and a pair of protruding end portions made to protrude from the slots to constitute an end-side coil end and tip portions of the pair of protruding end portions being respectively joined to tip portions of other protruding end portions adjacent thereto in a radial direction, wherein in-phase slot groups are provided for each pole, each including a plurality of in-phase slots signifying the slots accommodating the in-slot conductor portions constituting the phase windings in phase with each other and continuously arranged in circumferential directions for each pole, and the conductor accommodation positions of the slots are divided into r (where r=s/t) conductor accommodation position sets each composed of t (where t represents an integer) conductor accommodation positions continuously located in radial directions, and the in-phase slots identical in order of position from one of circumferential directions of the in-phase slot group accommodate a partial coil in each of the conductor accommodation position sets, and the phase winding is constructed in a manner such that radial series coils formed by connecting the partial coils of the conductor accommodation position sets different from each other in series to each other through an inter-layer connection line, which are equal in number to the in-phase slots of the in-phase slot group, are connected in parallel with each other.

That is, according to this aspect of the present invention, the partial coils pertaining to the conductor accommodation position sets different from each other in radial directions are connected one by one in series to each other to form the radial series coils which are equal in number to the in-phase slots of the in-phase slot group, with these radial series being connected in parallel with each other.

Thus, the partial coils accommodated in the conductor accommodation position set comprising a plurality of conductor accommodation positions existing continuously in radial directions of the in-phase slots taking the predetermined order of radial position in the in-phase slot group can be connected in series and in parallel to each other without complicating the connections between the partial coils. Accordingly, by increasing the number of partial coils in circumferential directions or in radial directions, it becomes possible to easily realize the supply of a large current to the sequential segment joining stator coil and the handling of a high voltage therein. In consequence, this realizes a sequential segment joining stator coil which is capable of coping with a high voltage and a large current, which has been considered so as not to be easy so far.

A further explanation will be given below. The conventional sequential segment joining stator coil creates a problem in that difficulty is experienced in carrying a large current through a parallel circuit arrangement due to a limitation on the segment location pattern and difficulty is experienced in handling a high voltage due to a limitation on the increase in number of turns. On the other hand, a large number of partial coils composed of simple sequential segment joining coils are sequentially connected in circumferential directions and in radial directions to complete a phase winding forming a partial-coil series/parallel-connected circuit, thereby simplifying the arrangement of connection lines among the partial coils and easily avoiding the mutual interference among the connection lines. This can not only reduce the occupying space of the connection lines to be located at the head-side coil end, but also reduce the size and weight of the electric rotating machine accordingly, and even reduce the resistance loss and heat generation in the connection lines.

Therefore, in particular, the sequential segment stator coil type electric rotating machine according to the present invention is effective in a case in which a conventional 14-V battery for a vehicle is voltage-boosted (for example, up to 42V). Meanwhile, for example, if the connection state of three partial coils organizing a radial series coil of a phase winding is changed from the series connection to the parallel connection, it can also function as a conventional 14-V vehicle electric rotating machine.

Preferably, the series connection between the partial coils organizing a radial series coil is realizable through the use of a dedicated connection segment. In this connection segment, a pair of in-slot conductor portions can also function as head in-slot conductor portions of two partial coils adjacent to each other in a radial direction (it is also acceptable that they are shifted in a circumferential direction) and the last in-slot conductor portions.

In a preferable mode, the combinations of the partial coils constituting the radial series coils of the phase winding are determined so that the total theoretical vector electromotive voltages (electromotive forces) of the respective radial series coils become equal to each other.

There is a problem which arises with the above-described partial-coil series/parallel connection type sequential segment joining stator coil in that, since the partial coils constituting each of the radial series coils are shifted in a circumferential direction, a phase difference occurs between the theoretical vector electromotive forces of the partial coils, which makes a difference in the total theoretical vector electromotive force (voltage) between the radial series coils. This difference between the theoretical vector electromotive forces develops a circulating current circulating through two radial series coils constituting a phase winding, which causes the heat generation of the electric rotating machine, the loss, the enhancement of noise, and the lowering of the efficiency and output.

For this reason, in this mode, the combinations of partial coils constituting radial series coils are selectively set so that the vector sums of the theoretical vector electromotive forces of the partial coils of the radial series coils become equal to each other, in other words, so that the vector sum of the theoretical vector electromotive forces in each of the radial series coils agrees with the vector sum of the theoretical vector electromotive forces in the other radial series coil. This prevents the circulating current from circulating through the radial series coils, that is, solves the above-mentioned problem.

In a preferable mode, of the inter-layer connection lines of the respective radial series coils, the inter-layer connection lines located at the same position in a radial direction are separately placed in the in-phase slot groups different from each other in a circumferential direction.

That is, a partial coil is constructed in a manner such that the in-slot conductor portions accommodated in specific in-phase slots existing at an interval of one pole pitch in a circumferential direction are connected in series to each other in the same conductor accommodation position set. At this time, in the case of the same current supplying direction, even if, of these in-slot conductor portions, the in-slot conductor portion at any position in the circumferential direction is used as a head in-slot conductor portion of this partial coil, the electromagnetic equivalence is attainable.

Therefore, in this mode, in order to prevent the inter-layer connection lines of the radial series coils from overlapping spatially with each other, the inter-layer connection lines existing at the same position in circumferential directions of the radial series coils are shifted in the circumferential directions. In this connection, it is preferable that the inter-layer connection lines existing at the same position in radial directions are shifted by one pole pitch for the purpose of shortening the wiring distance of radial crossover which takes place afterwards. This can shorten the axial length of the inter-layer connection line occupying space and the overall length of the inter-layer connection lines, thus further promoting the above-mentioned effects of the present invention.

In a preferable mode, the partial coil is constructed in a manner such that wave winding segments forming segments passing through the first and fourth layers of the conductor accommodation position set in its radial directions and lap winding segments forming segments passing through the second and third layers thereof are alternately connected to form first and second circling coils which substantially make a circuit, and shape-different wave winding segments forming the last in-slot conductor portion of the first circling coil and the head in-slot conductor portion of the second circling coil are connected in series thereto, with it being accommodated in one in-phase slot of the in-phase slot group which has a predetermined order in a circumferential direction.

Thus, the radial connection segments forming the inter-layer connection lines can easily be placed while avoiding the spatial interference with the lap winding segments or the wave winding segments. Moreover, multi-turn partial coils can be constructed while avoiding the complication of the coil end construction, and since a pair of in-slot conductor portions of a radial connection segment forming an inter-layer connection line constitute a head or last in-slot conductor portion of each of the partial coils, the connection operations among the partial coils can continuously be conducted in the other segment joining process and the simplification of the process is achievable.

BRIEF DESCRIPTION OF THE DRAWINGS

Other objects and features of the present invention will become more readily apparent from the following detailed description of the preferred embodiments taken in conjunction with the accompanying drawings in which.

DESCRIPTION OF THE PREFERRED EMBODIMENTS

Figure 1:
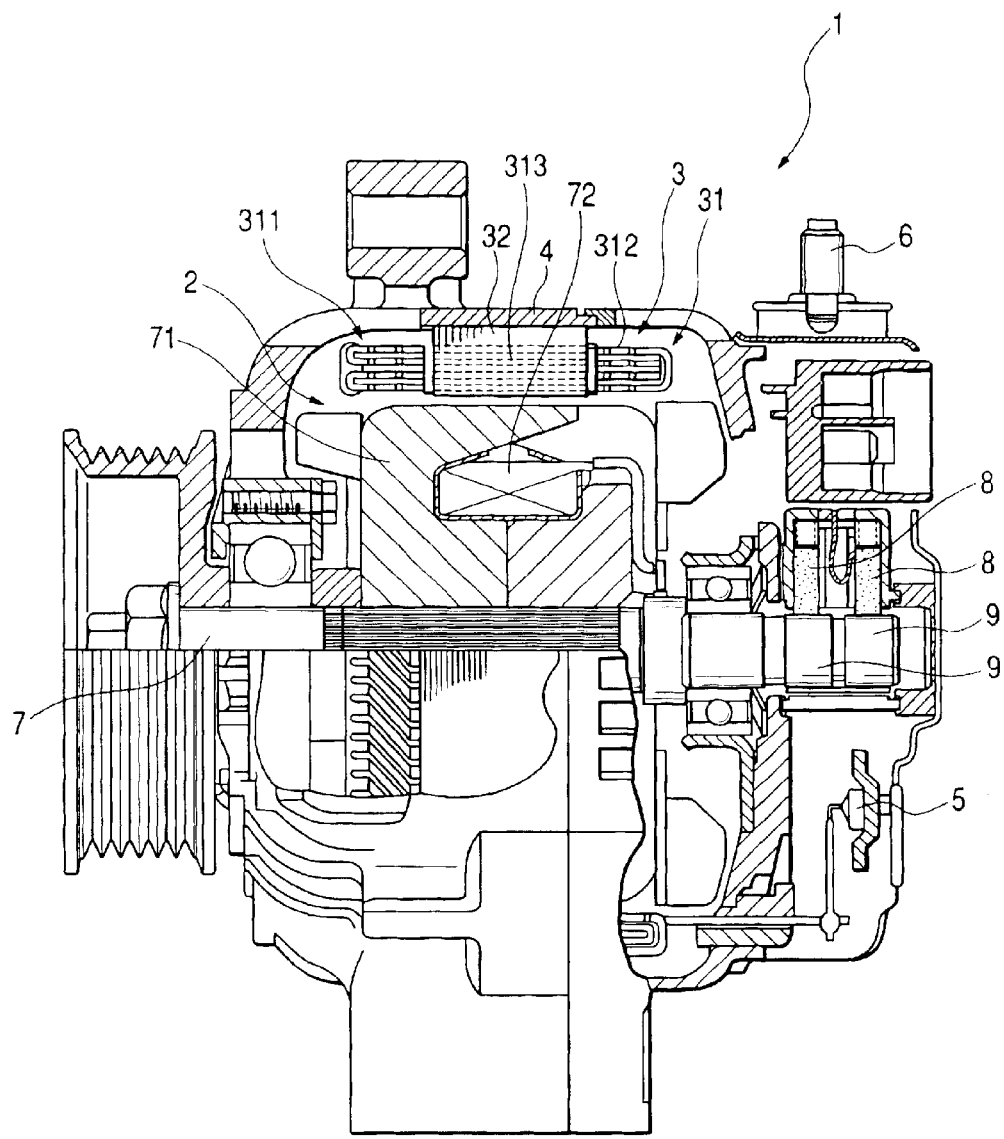
FIG. 1 is an axial cross-sectional view showing a sequential segment joining stator coil electric rotating machine for a vehicle according to an embodiment of the present invention.
Figure 2:
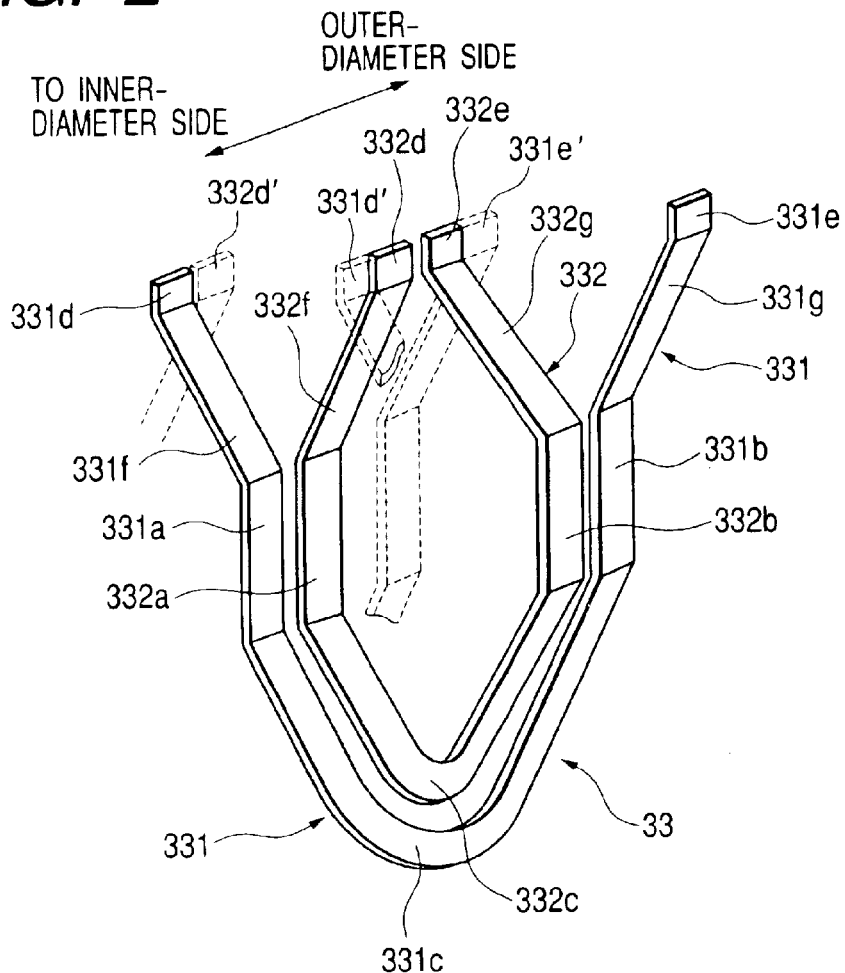
FIG. 2 is a perspective view showing a segment set according to this embodiment.
Figure 3:
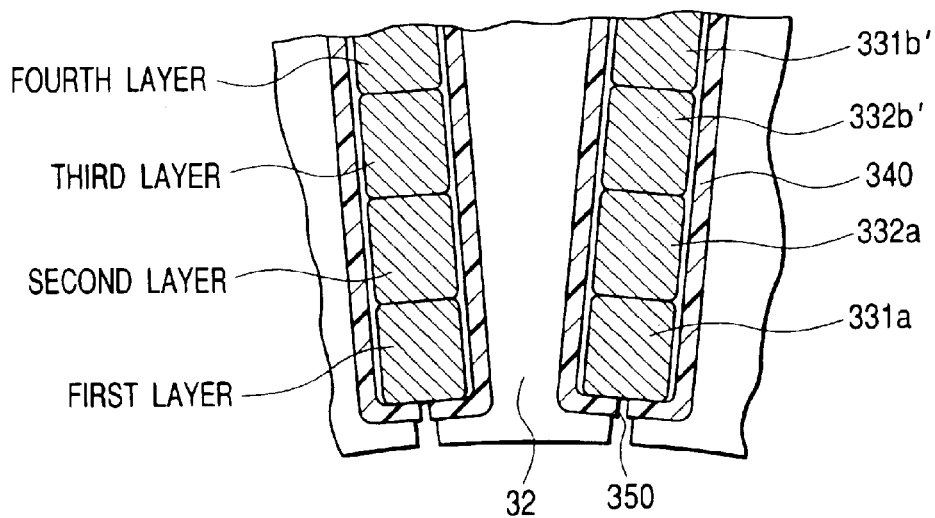
FIG. 3 is an illustration of the location of conductors in slots according to this embodiment.

A description will be given hereinbelow of a sequential segment joining stator coil type electric rotating machine according to an embodiment of the present invention.
Description of the Entire Construction In FIG. 1, a sequential segment joining stator coil type electric rotating machine, generally designated at reference numeral 1, is constructed as an AC (Alternating Current) generator comprising a rotor 2, a stator 3, a housing 4, a rectifier 5, an output terminal 6, a rotary shaft 7, brushes 8 and slip rings 9. The stator 3 is composed of a stator coil 31 and a stator core 32, with the stator core 32 being fixedly secured onto an inner circumferential surface of a circumferential wall of the housing 4 and the stator coil 31 being placed in slots of the stator core 32 in a wound condition. The rotor 2 is of a Lundell-pole type fixed to the rotary shaft 7 supported by the housing 4 to be rotatable, and is located on a radial inner side of the stator core 32. The stator coil 31 is a three-phase armature winding, and is made in a manner such that segment sets 330, shown in FIG. 2, are inserted through insulating paper 340 into a predetermined number of slots 350, formed in the stator core 32, from one side in axial directions as shown in FIG. 3, and the radially adjoining tip portions thereof are sequentially connected to each other on the other side in the axial directions. The stator coil 31 has an end-side coil end 311 on the other side in the axial directions and a head-side coil end 312 on the one side in the axial directions. The sequential segment joining stator coil itself thus constructed is already well known.

Description of Segment Set 330

Referring to FIG. 2, a detailed description will be given hereinbelow of the segment set 330.

The segment set 330 is made up of one large segment 331 and one small segment 332 each composed of a generally U-shaped head portion, a pair of in-slot conductor portions formed to extend linearly from both ends of the head portion and inserted into slots, and a pair of protruding end portions formed to extend from the tips of both the in-slot conductor portions.

The head portions constitute the head-side coil end 312 (see FIG. 1) residing on one side of the stator core 32 in axial directions to have a ring-like configuration as a whole while the protruding end portions constitute the end-side coil end 311 (see FIG. 1) existing on the other side of the stator core 32 in the axial directions to have a ring-like configuration as a whole.

The segment set 330 is composed of a large segment (equally referred to as a "large-turning segment") 331 and a small segment (equally referred to as a "small-turning segment") 332. The large segment 331 and the small segment 332 surrounded by the large segment 331 are referred to as a "segment set".

In the large segment 331, numerals 331a and 331b depict in-slot conductor portions, numeral 331c designates a head portion, and numerals 331f and 331g denote protruding end portions. Each of the tip portions 331d and 331e of the protruding end portions 331f and 331g are joining portions and, hence, is equally referred to as an "end tip portion" or "joining portion". The in-slot conductor portion 331a is referred to as a "first-layer in-slot conductor portion" while the in-slot conductor portion 331b is referred to as a "fourth-layer in-slot conductor portion".

In the small segment 332, numerals 332a and 332b represent in-slot conductor portions, numeral 332c designates a head portion, and numeral 332f and 332g denote protruding end portions. Each of the tip portions 332d and 332e of the protruding end portions 332f and 332G are joining portions and, hence, is equally referred to as an "end tip portion" or "joining portion". The in-slot conductor portion 332a is referred to as a "second-layer in-slot conductor portion" while the in-slot conductor portion 332b is referred to as a "third-layer in-slot conductor portion".

The sign' signifies the same portion as the portions with no sign' in a large segment or small segment which is not shown. Therefore, in FIG. 2, the joining portion 331d and the joining portion 332d' adjoining each other in a radial direction are welded to each other, and the joining portion 332d and the joining portion 331d' adjoining each other in a radial direction are welded to each other, and the joining portion 332e and the joining portion 331e' adjoining each other in a radial direction are welded to each other.

In FIG. 2, in a case in which the first-layer in-slot conductor portion 331a and the second-layer in-slot conductor portion 332a are accommodated in a predetermined slot, in the same segments 331, 332, the fourth-layer in-slot conductor portion 331b and the third-layer in-slot conductor portion 332b are accommodated in a slot separated by a predetermined pitch from the first-mentioned predetermined slot. The head portion 332c of the small segment 332 is located to be surrounded by the head portion 331c of the large segment 331. The large segment 331 organizes a wave winding segment in the present invention, while the small segment 332 organizes a lap winding segment therein.

Location of Segment Set within Slots

FIG. 3 shows a location state of a segment set in a slot 350.

In the slot 350, s (16 in this embodiment) conductor accommodation positions are set in a radial direction, and four conductor accommodation positions adjacent in the radial direction are referred to as a conductor accommodation position set and are referred to as first layer, second layer, third layer and fourth layer in order from the inner side in a radial direction. The four kinds of in-slot conductor portions of the segment set described above with reference to FIG. 2 are inserted into the first-layer to fourth-layer conductor accommodation positions of these conductor accommodation position set and, eventually, four segment sets are placed in the slot 350. However, naturally, the two in-slot conductor portions which are accommodated at the first and fourth layers of the same slot belong to a different large segment (wave winding segment) 331 while the two in-slot conductor portions which are accommodated at the second and third layers of the same slot pertain to a different small segment (lap winding segment) 332.

As FIG. 3 shows, the in-slot conductor portions 331a, 332a, 332b' and 331b' are accommodated in the first-layer to fourth-layer conductor accommodation positions of each of the conductor accommodation position sets in order in a radial direction. That is, when viewed from the inside in a radial direction, the first-layer in-slot conductor portion 331a is accommodated in the first-layer conductor accommodation position, the second-layer in-slot conductor portion 332a is accommodated in the second-layer conductor accommodation position, the third-layer in-slot conductor portion 332b' is put in the third-layer conductor accommodation position, and the fourth-layer in-slot conductor portion 331b' is put in the fourth-layer conductor accommodation position.

Figure 4:
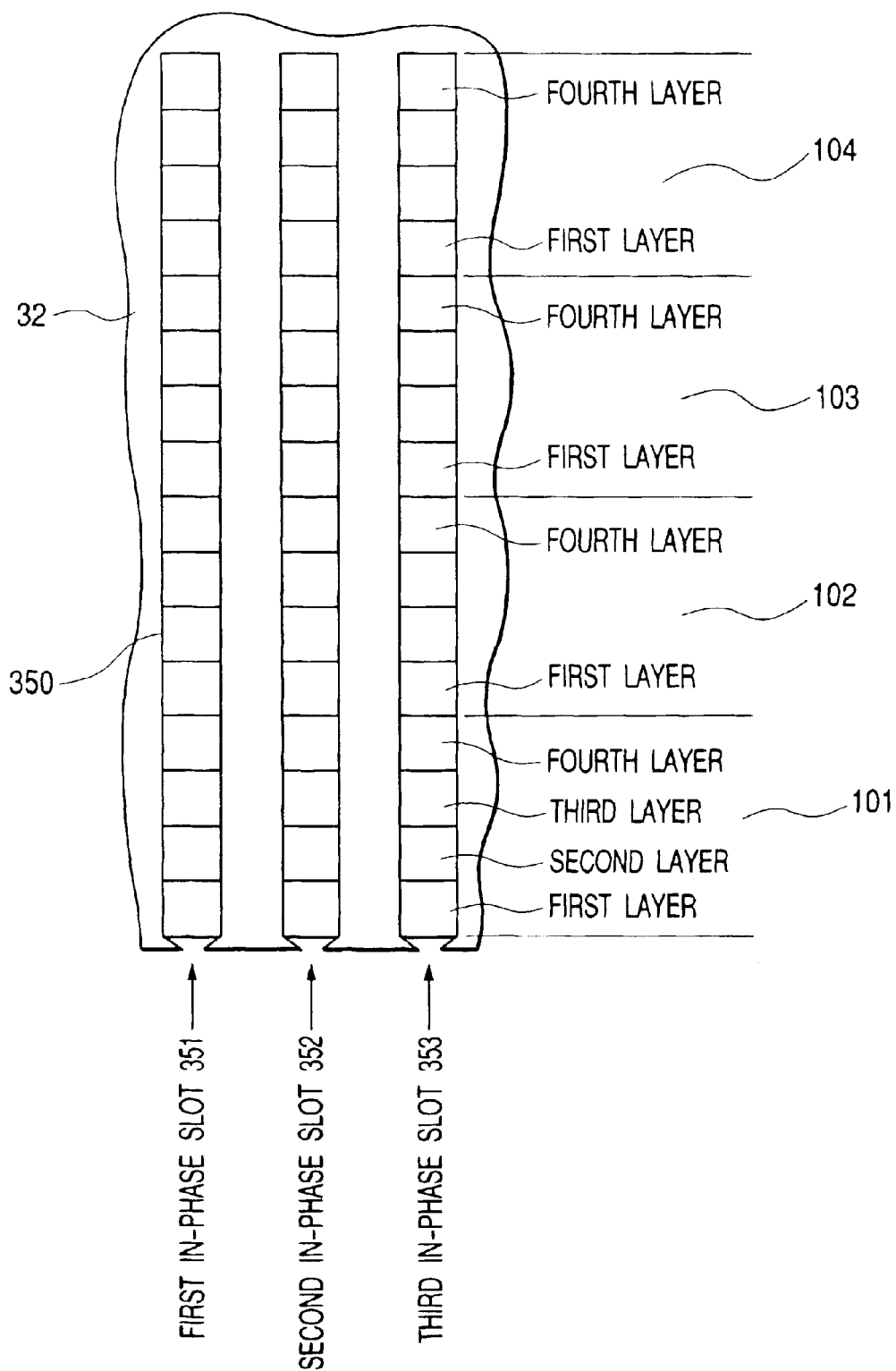
FIG. 4 is an illustrative view showing locations of slots according to this embodiment.

Although FIG. 3 shows a state in which the radial innermost side segment set 330 is accommodated in the slot 350, three segments sets 330 are additionally located in a radial direction as shown in FIG. 4. In FIG. 4, an in-phase voltage is applied to the segments accommodated in three slots adjacent to each other. Since the stator coil in this embodiment is of a three-phase winding type in which three phase windings U, V and W are star-connected, if the number of pole pairs is taken as p, 18p slots are formed therein. In the following description, each of three slots 351 to 353 accommodating in-phase windings and placed adjacently to each other in a circumferential direction will be referred to as an "in-phase slot", and these three in-phase slots will be referred to as an "in-phase slot group". Moreover, the in-phase slot 351 will equally be called a first in-phase slot, the in-phase slot 352 will equally be called a second in-phase slot, and the in-phase slot 353 will equally be referred to as a "third in-phase slot". Each of the slots 351 to 353 is equipped with four conductor accommodation position sets 101 to 104 each having first-layer to fourth-layer conductor accommodation positions.

Description of Three-Phase Stator Coil

Figure 5:
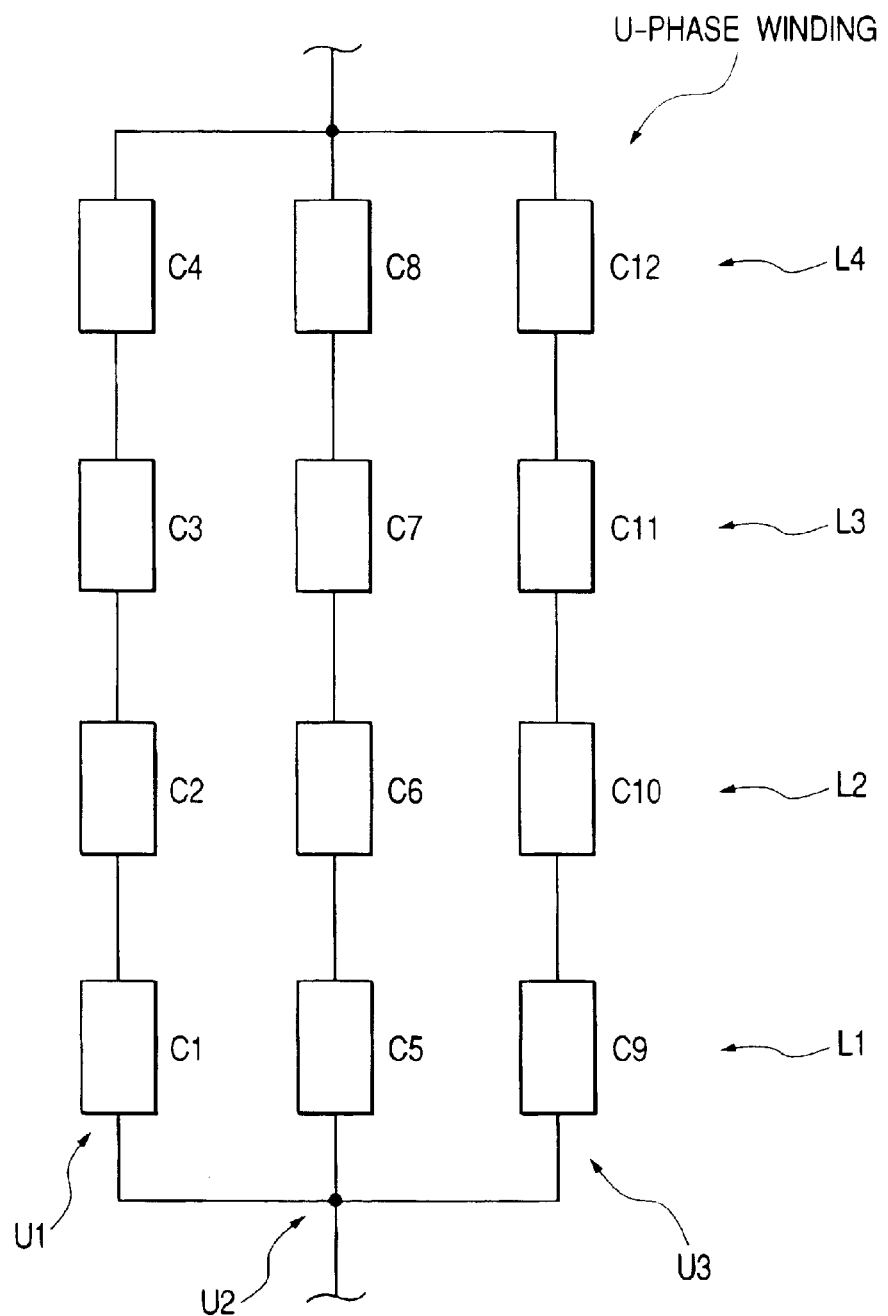
FIG. 5 is an illustration of a phase winding circuit according to this embodiment.
Figure 6:
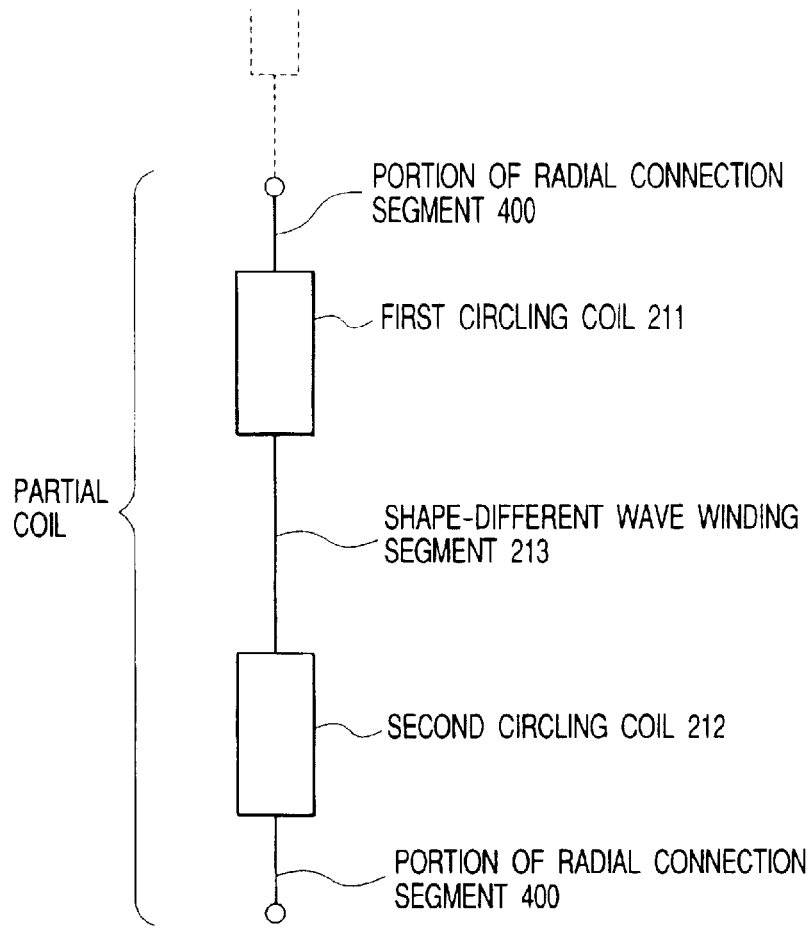
FIG. 6 is an illustration of a partial-coil circuit according to this embodiment.

FIG. 5 shows the connections of a U-phase winding of the star-connected sequential segment joining stator coil according to this embodiment. Naturally, the other-phase windings have the same arrangement although being shifted in a circumferential direction.

The U-phase winding is constructed in manner such that 12 partial coils C1 to C12 in total, individually accommodated in the same conductor accommodation position set and in the same in-phase slot while accommodated in conductor accommodation position sets different from each other or in-phase slots different from each other, are connected in series and in parallel to each other. The partial coils C1 to C4 are connected in series to each other to constitute a first radial series coil U1, and the partial coils C5 to C8 are connected in series to each other to constitute a second radial series coil U2, and further the partial coils C9 to C12 are connected in series to each other to constitute a third radial series coil U3. The radial series coils U1, U2 and U3 are connected in parallel with each other.

Each of the partial coils C1, C5 and C9 is made through the use of a segment set L1 accommodated in one in-phase slot of the in-phase slot groups in the radial innermost side conductor accommodation position set 101, each of the partial coils C2, C6 and C10 is made by a segment set L2 accommodated in one in-phase slot of the in-phase slot groups in the second conductor accommodation position set 102 when viewed from the inside in a radial direction, each of the partial coils C3, C7 and C11 is made by a segment set L3 accommodated in one in-phase slot of the in-phase slot groups in the third conductor accommodation position set 103 when viewed from the inside in the radial direction, and each of the partial coils C5, C8 and C112 is made by a segment set L4 accommodated in one in-phase slot of the in-phase slot groups in the fourth conductor accommodation position set 104 when viewed from the inside in the radial direction. That is, the partial coils C1 to C12 are accommodated in the same conductor accommodation position sets and in the in-phase slots of the in-phase slot groups identical in order of position (having the same positional order) in a circumferential direction. For the simplicity of the illustration only, FIG. 3 shows only one-layer coils accommodated in one conductor accommodation set.

Figure 7:
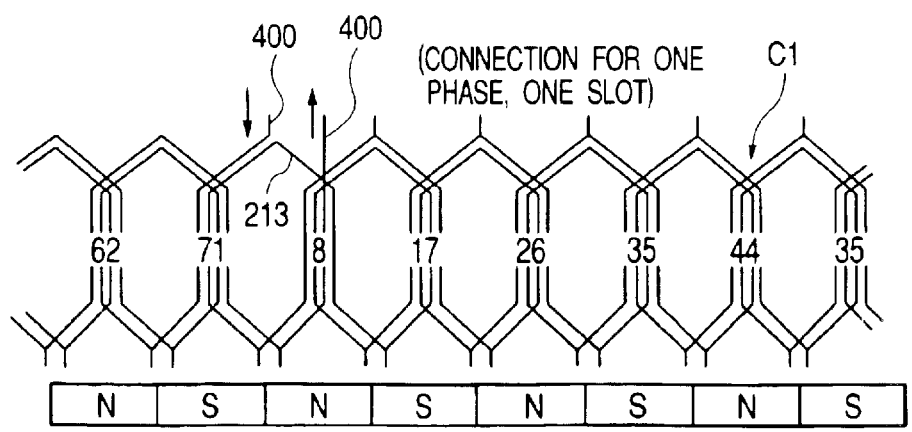
FIG. 7 is an development illustration of a partial winding of one partial coil according to this embodiment.

Each of the partial coils C1 to C12 is made such that a first circling coil 211 and a second circling coil 212 are connected through the use of a shape-different wave winding segment 213. Each of the first circling coil 211 and the second circling coil 212 has a configuration in which wave winding segments and lap winding segments are alternately connected to substantially make one circuit. In this case, the wave winding segment is a segment in which a pair of protruding end portions are bent in separating directions from each other, and has in-slot conductor portions to be accommodated in first and fourth conductor accommodation positions. On the other hand, the lap winding segment is a segment in which a pair of protruding end portions are bent in approaching directions with respect to each other, and has in-slot conductor portions to be accommodated in second and third conductor accommodation positions. Moreover, the shape-different wave winding segment 213 is a segment in which a pair of in-slot conductor portions respectively pass through second and fourth layers separated by one pole pitch from each other. Therefore, the last in-slot conductor portion of the first circling coil 211 and the head in-slot conductor portion of the second circling coil constitute a pair of in-slot conductor portions of the shape-different wave winding segment 213. In FIG. 7, both the end portions of the partial coil C1 organize a radial connection segment 400.

Figure 8:
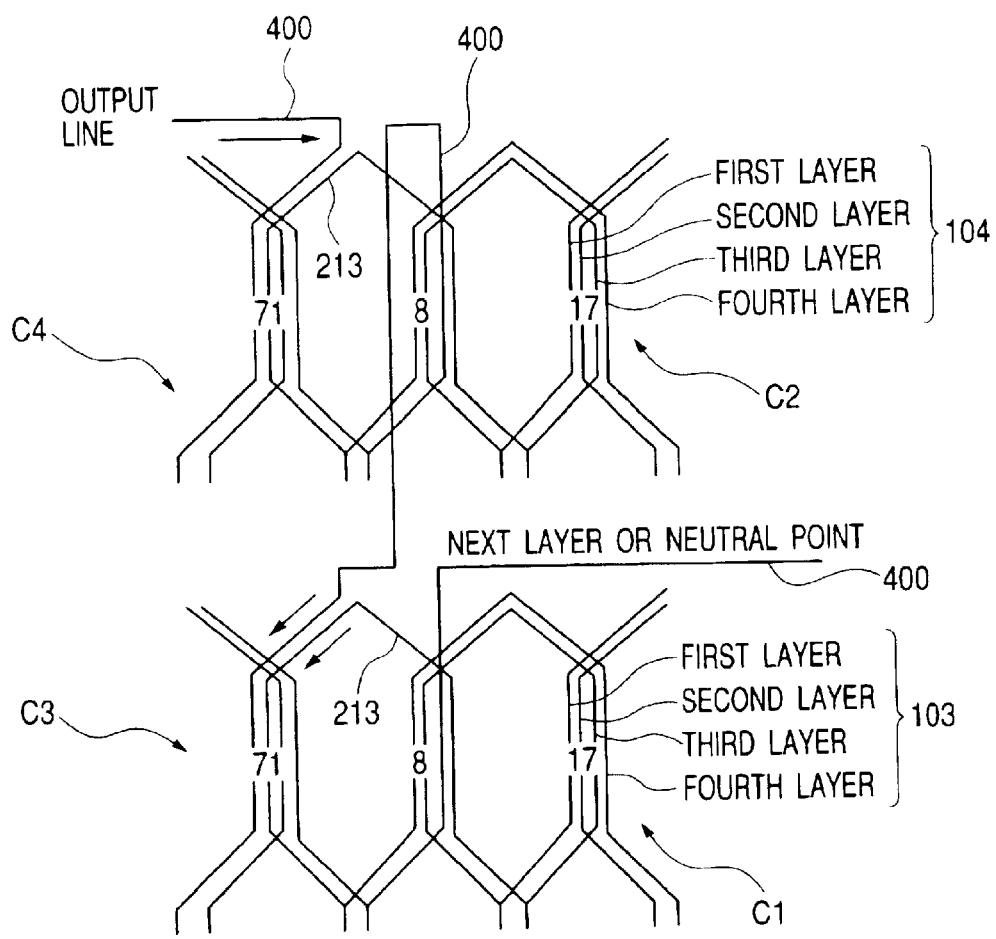
FIG. 8 is an development illustration of a partial winding forming a connection between two partial coils adjacent to each other in a radial direction according to this embodiment.

FIG. 8 shows an example in which the two partial coils C3 and C4 are connected through the use of inter-layer connection lines made by a radial connection segment 400. A pair of in-slot conductor portions of the radial connection segment 400, serving as the inter-layer connection lines, form the third-layer in-slot conductor portion (the last in-slot conductor portion of the second circling coil of the partial coil C4) on the partial coil C4 side and the first-layer in-slot conductor portion (the head in-slot conductor portion of the first circling coil of the partial coil C3) on the partial coil C3 side.

Figure 9:
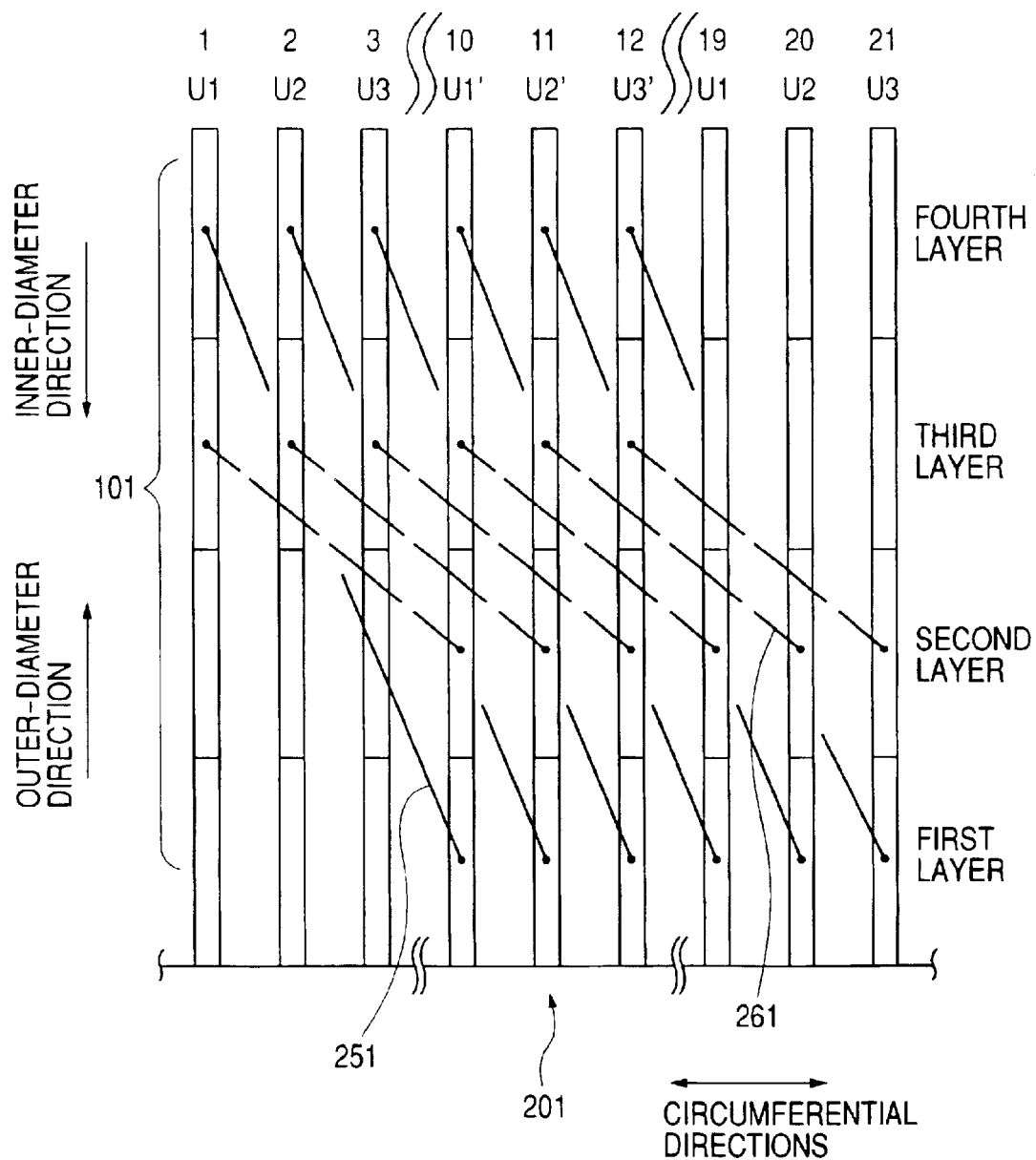
FIG. 9 is an illustration of a portion of a head-side coil end according to this embodiment.
Figure 10:
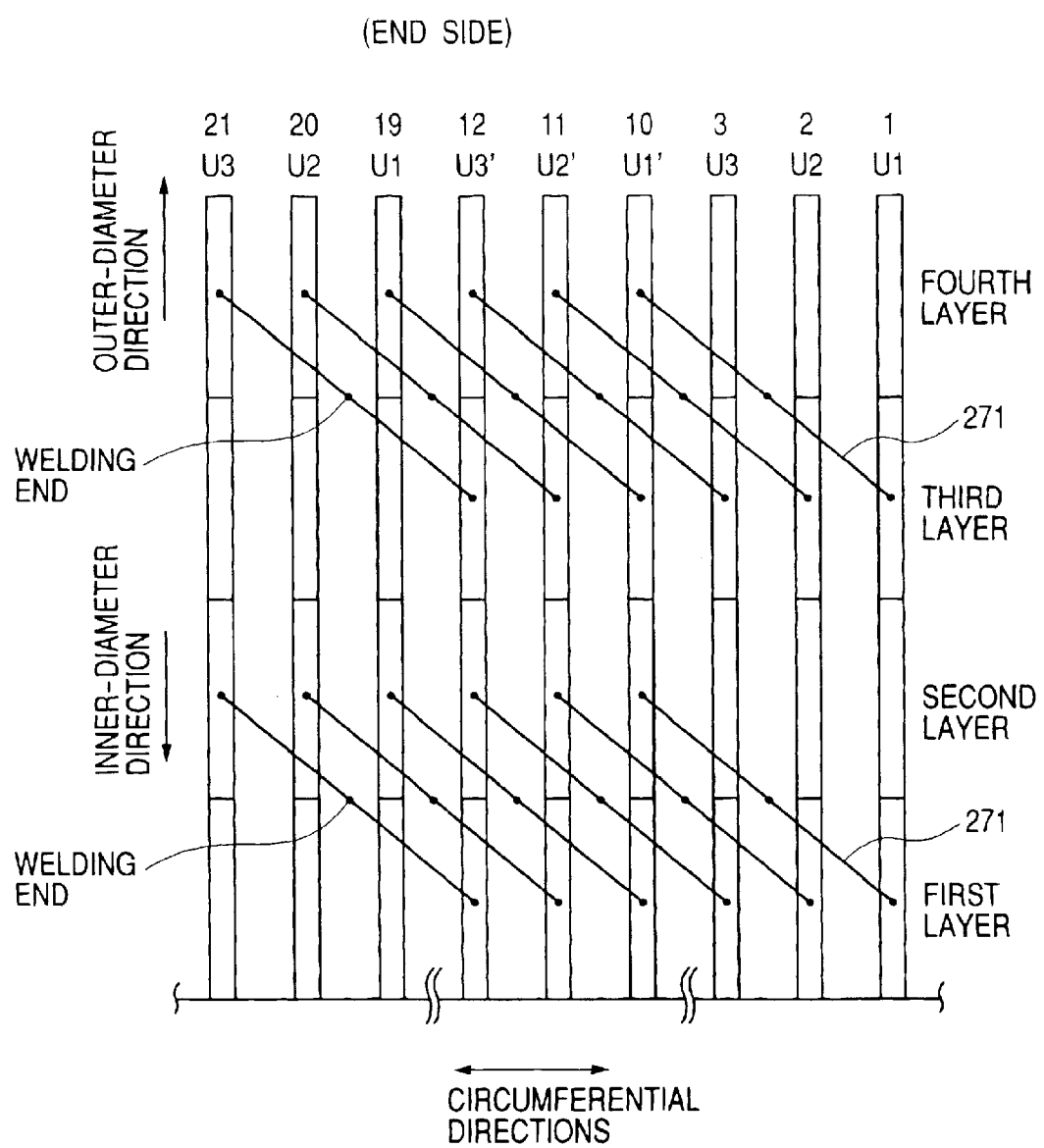
FIG. 10 is an illustration of a portion of an end-side coil end according to this embodiment.

FIG. 9 shows a portion of a head-side coil end 311 of each of the partial coils disposed in one conductor accommodation position set, and FIG. 10 shows a portion of an end-side coil end 312 of each of the partial coils disposed in one conductor accommodation position set.

Description of Location of Radial Connection Segment 400 Forming Inter-Layer Connection Lines As described above with reference to FIG. 5, the radial series coils U1, U2 and U3 are made by selectively one by one connecting the partial coils of the segment sets L1 to L4 arranged in a radial direction and accommodated in each of in-phase slots. However, the in-phase slots 351, 352 and 353 (see FIG. 4) are successively shifted by one slot pitch in a circumferential direction and, due to this shifting, for example, the electromotive voltage (equally referred to as electromotive force) of the partial coil of the in-phase slot 351 leads that of the in-phase slot 352 by a phase corresponding to one slot pitch while the electromotive voltage (equally referred to as electromotive force) of the partial coil of the in-phase slot 353 lags that of the in-phase slot 352 by a phase corresponding to one slot pitch.

Accordingly, for example, if all the partial coils C1 to C4 constituting the radial series coil U1 are accommodated in the in-phase slot 351, all the partial coils C5 to C8 constituting the radial series coil U2 are accommodated in the in-phase slot 352 and all the partial coils C9 to C12 constituting the radial series coil U3 are accommodated in the in-phase slot 353, the electromotive force of the radial series coil U1 leads that of the radial series coil U2 by a phase corresponding to one slot pitch while the electromotive force of the radial series coil U3 lags that of the radial series coil U2 by a phase corresponding to one slot pitch. In consequence, a circulating current flows through the radial series coils U1 to U3 and an useless torque ripple occurs in accordance with this circulating current.

For solving this problem, combinations of the partial coils constituting the radial series coils U1 to U3 may be selectively made so that the total theoretical vector electromotive forces agree with each other. That is, the adjustment of the in-phase slots accommodating the partial coils C1 to C12 takes place.

Figure 11:
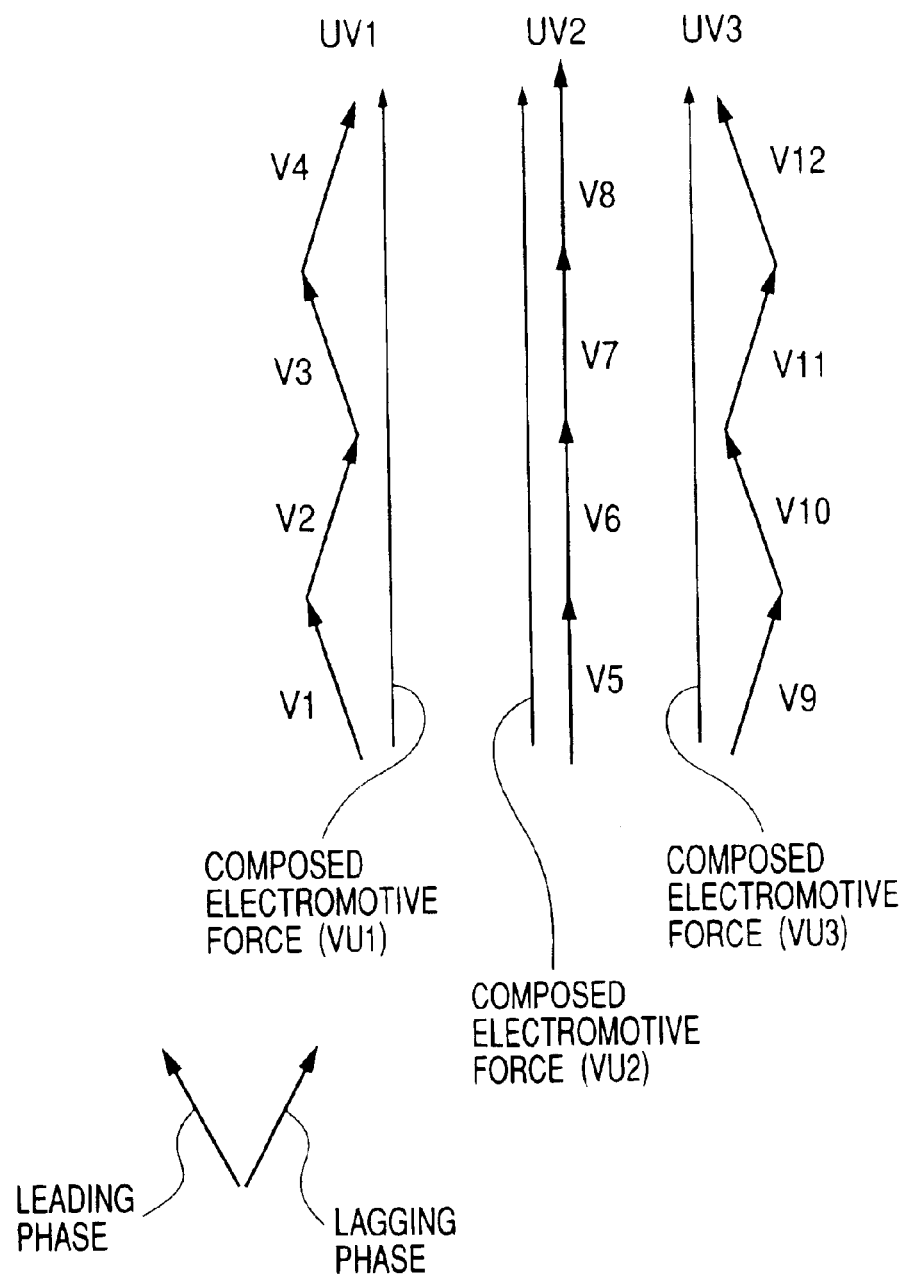
FIG. 11 is an illustration of electromotive force vectors, showing an example of making the phases of the theoretical vector electromotive forces of three radial series coils agree with each other according to this embodiment.

A further concrete description will be given hereinbelow with reference to FIG. 11. In FIG. 11, VU1 represents a theoretical vector electromotive force of the radial series coil U1, VU2 depicts a theoretical vector electromotive force of the radial series coil U2, and VU3 denotes a theoretical vector electromotive force of the radial series coil U3, and V1 indicates a theoretical vector electromotive force of the partial coil C1 and, likewise, V2 to V12 designate theoretical vector electromotive forces of the partial coils C2 to C12, respectively.

For example, the partial coils C1, C10, C3 and C12 are accommodated in the in-phase slot 351, and the partial coils C5 to C8 are accommodated in the in-phase slot 352, and the partial coils C9, C2, C11 and C4 are accommodated in the in-phase slot 353. In this case, the total theoretical vector electromotive forces of the radial series coils U1 to U3 agree with each other. That is, the electromotive force of the radial series coil U1 becomes in phase with that of the radial series coil U2 and the electromotive force of the radial series coil U3 becomes in phase with that of the radial series coil U2, thereby preventing the aforesaid circulating current from circulating through the radial series coils U1 to U3.

In this way, in a case in which different partial coils are located in a plurality of in-phase slots and these partial coils are connected in series and in parallel to each other, the combinations of the partial coils constituting the radial series coils are adjusted so that the total theoretical vector electromotive forces of the respective radial series coils agree with each other. There may be various kinds of combination of the partial coils. Preferably, the inter-layer connection lines (radial connection segment 400) for making connections among the partial coils of the radial series coil adjacent in a radial direction are located so that each pair of radial series coils take an axial-symmetrical relation to each other. At this time, this axial (line) symmetry may be established with a line passing through a center point of an in-phase slot group in a circumferential direction and extending in a radial direction being taken as a center line.

Furthermore, referring to FIG. 12, a description will be given hereinbelow of an example of construction of inter-layer connection lines.

All the partial coils C5 to C8 constituting the radial series coil U2 show no lagging of phase. In other words, since the partial coils C5 to C8 are always accommodated in, of the three in-phase slots 351 to 353 organizing an in-phase slot group, the in-phase slot 352 existing at a central portion in a circumferential direction, the phase leading/lagging does not occur therein.

Of the partial coils C1 to C4 constituting the radial series coil U1, the partial coils C1 and C3 lead in phase by an electrical angle corresponding to one slot pitch (they are accommodated in the in-phase slot 351) while the partial coils C2 and C4 lag in phase by an electrical angle corresponding to one slot pitch (they are accommodated in the in-phase slot 353). Therefore, the phase leading and lagging can be canceled as a whole. Likewise, of the partial coils C9 to C12 constituting the radial series coil U3, the partial coils C10 and C12 lead in phase by an electrical angle corresponding to one slot pitch (they are accommodated in the in-phase slot 351) while the partial coils C9 and C11 lag in phase by an electrical angle corresponding to one slot pitch (they are accommodated in the in-phase slot 353). Likewise, the phase leading and lagging can be offset as a whole.

Figure 12:
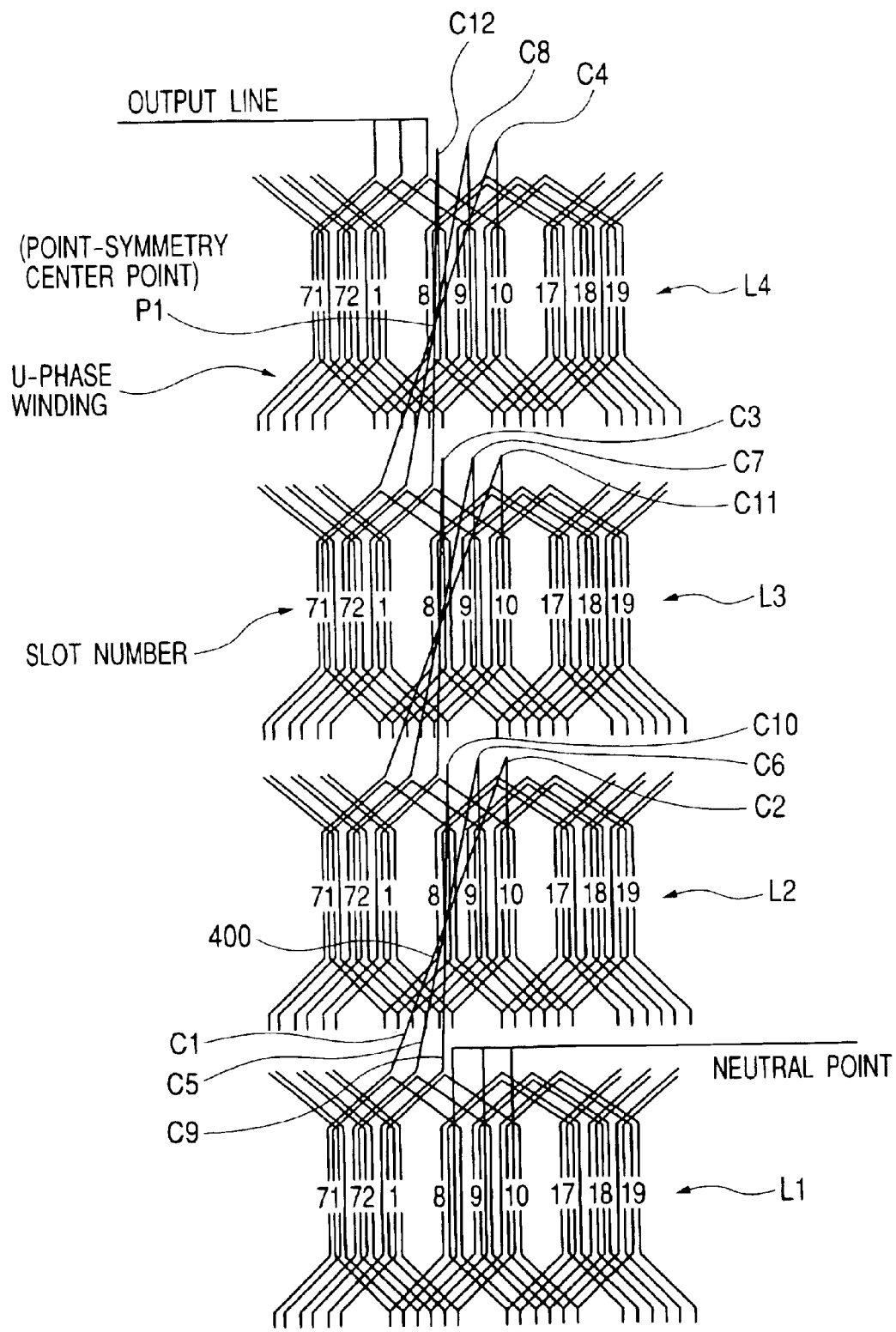
FIG. 12 is an illustration useful for explaining a cross location of inter-layer connection lines (radial connection segments) at a head-side coil end in the case of making the phases of the theoretical vector electromotive forces of three radial series coils agree with each other.

Eventually, in FIG. 12, the inter-layer connection lines 400, which make connections three pairs of partial coils adjacent in a radial direction, are in a point symmetry with respect to a predetermined center point.

Figure 13:
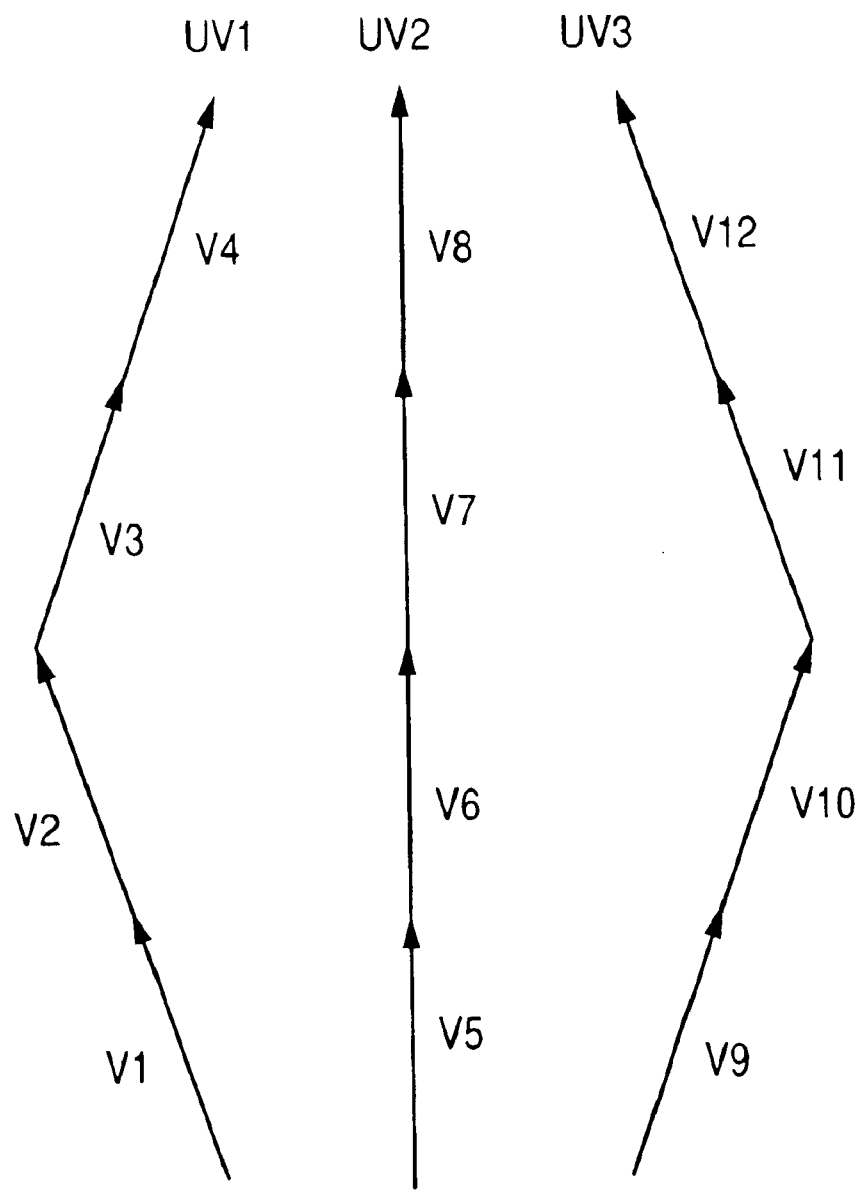
FIG. 13 is an illustration of electromotive force vectors, showing an example of making the phases of the theoretical vector electromotive forces of three radial series coils agree with each other according to a modification of this embodiment.
Figure 14:
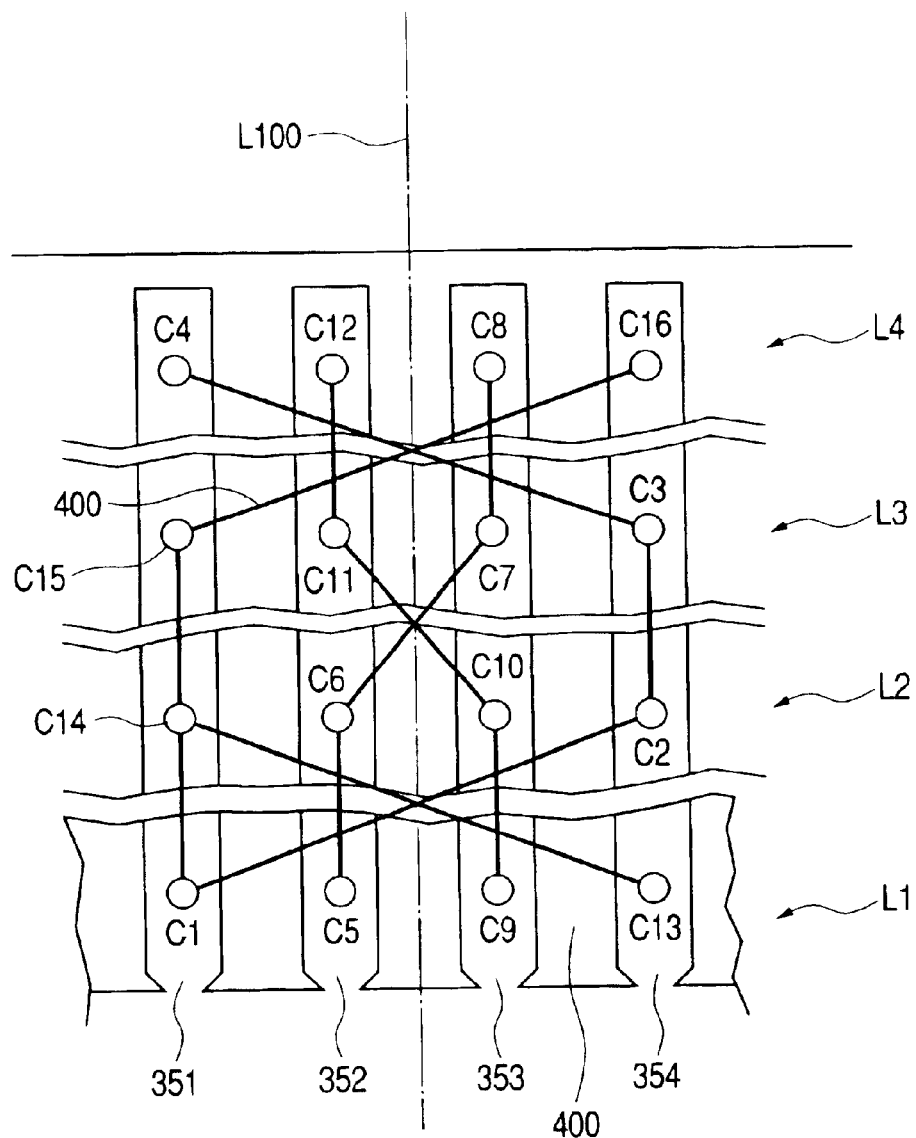
FIG. 14 is an illustration useful for explaining a cross location of inter-layer connection lines (radial connection segments) at a head-side coil end in the case of making the phases of the theoretical vector electromotive forces of four radial series coils agree with each other according to this embodiment.

FIG. 13 is an illustration of a modification of the FIG. 11 example, and the effects thereof are the same. FIG. 14 is an illustration of an example in which there are four in-phase slots 351 to 354.

In this case, the phase winding has a radial series coil U4 in addition to the radial series coils U1 to U3 shown in FIG. 5. The radial series coil U4 is made by connecting partial coils C13 to C16 in series. FIG. 14 is an illustration of the locations of the partial coils C1 to C16 in a cross section in a radial direction. Also in this case, the total theoretical vector electromotive forces of the radial series coils U1 to U4 agree with each other. In FIG. 14, L100 represents a line passing through a circumferential center point of the in-phase slot group and extending in a radial direction, and the locations of the inter-layer connection lines which make connections among the partial coils are made to establish the axial symmetry with respect to this line L100.

Modification

In the above-described embodiment, the inter-layer connection lines 400 of the radial series coils U1 to U3 are located to cross each other. This crossing of the inter-layer connection lines 400 is not preferable, for example, for that there is a need to make an expansion of the head-side coil end 311 in an axial direction.

Figure 15:
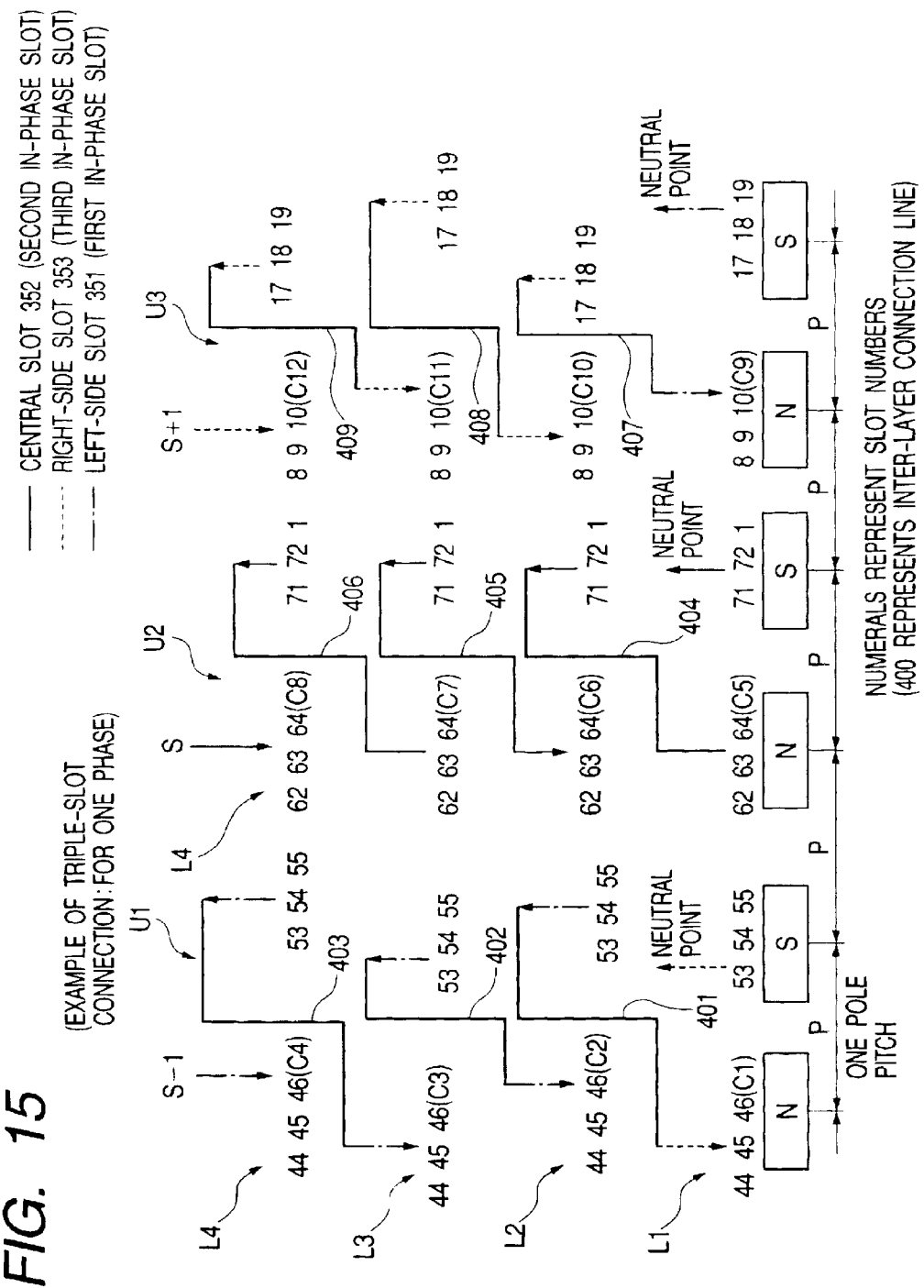
FIG. 15 is an illustrative view showing locations of inter-layer connection lines according to a further modification of this embodiment for making the phases of the theoretical vector electromotive forces of three radial series coils agree with each other and avoiding a cross location of inter-layer connection lines (radial connection segments) at a head-side coil end.

Therefore, in a modification shown in FIG. 15, the inter-layer connection lines of the radial series coils are shifted by two pole pitches in circumferential directions. A detailed description will be given with reference to FIG. 12.

As shown in FIG. 5, the radial series coil U1 is made by connecting the partial coils C1 to C4 in series, the radial series coil U2 is made by connecting the partial coils C5 to C8 in series, and the radial series coil U3 is made by connecting the partial coils C9 to C12 in series. In FIG. 15, reference numerals 44, 53, 62, 71, 8 and 17 designate first in-phase slots 351 of an in-phase slot group, numerals 45, 54, 63, 72, 9 and 18 denote second in-phase slots 352 of an in-phase slot group, and numerals 46, 55, 64, 73, 10 and 19 depict third in-phase slots 353 of an in-phase slot group. The theoretical vector electromotive forces of the partial coils of the radial series coils U1 to U3 appear as shown in FIG. 11 and, hence, the phase difference of the theoretical vector electromotive forces among the radial series coils U1 to U3 is eliminable.

In addition, in FIG. 15, the inter-layer connection lines 401 to 403 of the radial series coil U1 are located in a region between the slots 44 to 55, the inter-layer connection lines 404 to 406 of the radial series coil U2 are located in a region between the slots 63 to 72, and the inter-layer connection lines 407 to 409 of the radial series coil U3 are located in a region between the slots 8 to 19. That is, the inter-layer connection lines 401 to 403 of the radial series coil U1 are shifted by approximately two pole pitches with respect to the inter-layer connection lines 404 to 406 of the radial series coil U2 and, likewise, the inter-layer connection lines 404 to 406 of the radial series coil U2 are shifted by approximately two pole pitches with respect to the inter-layer connection lines 407 to 409 of the radial series coil U3. This can not only prevent the inter-layer connection lines from overlapping with each other, unlike the location shown in FIG. 12, but also prevent the head-side coil end 311 from protruding in an axial direction, and even achieve the size reduction of the inter-layer connection lines. Incidentally, naturally, the neutral point leading position and the U-phase terminal leading position are also shifted in accordance with the aforesaid shifting of the inter-layer connection lines 401 to 403 and 407 to 409.

Results of Experiment

Figure 16:
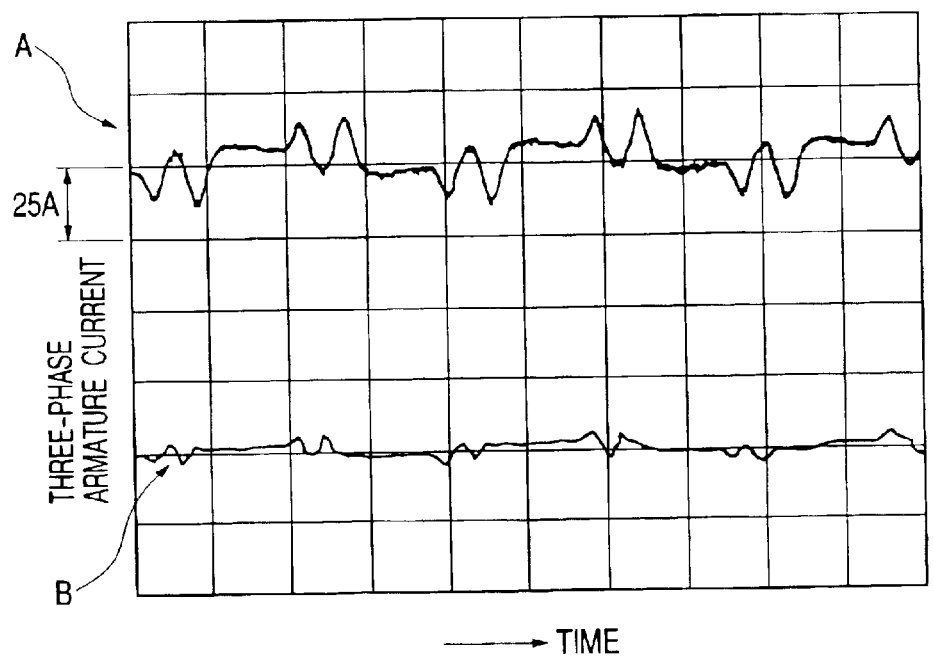
FIG. 16 is an timing chart showing circulating current waveforms in a case in which the agreement between the total theoretical vector electromotive forces is made between the radial series coils and in a case in which the agreement is not made therebetween.

FIG. 16 shows circulating currents flowing between the radial series coils U1 and U2 in a case in which the inter-layer connection lines 400 are located to cross each other as shown in FIGS. 11 and 12 and in the case of no crossing location of the inter-layer connection lines (when a group including the partial coils C1 to C4 and a group including the partial coils C5 to C8 generate electromotive forces which make a phase difference corresponding to one slot pitch therebetween. In FIG. 16, A represents a circulating current waveform in the case of no crossing location of the inter-layer connection lines and B depicts a circulating current waveform in the case of the crossing location thereof. In this case, the speed of rotation is 500 rpm and no-load running takes place. In the case of the cross location, the circulating current is reducible to below 1/10 (effective current ratio) of that in the case of no cross location (that is, the circulating current is reducible up to an almost unobserved level).

According to the embodiments described above, the series/parallel wiring among the partial coils is substantially realizable through the use of the radial connection segments 400, thereby simplifying the structure of the head-side coil end 311 and realizing parallel circuits.

It should be understood that the present invention is not limited to the above-described embodiments, and that it is intended to cover all changes and modifications of the embodiments of the invention herein which do not constitute departures from the spirit and scope of the invention.

For example, although in the above-described embodiment each of the partial coils is made through the use of a segment set occupying four conductor accommodation positions existing continuously in a radial direction, it is also appropriate that each of the partial coils is formed by using a segment set occupying two conductor accommodation positions existing continuously in a radial direction, or that both the segment sets are used in a mixed condition. The phase windings can be star-connected to each other, or they can also be delta-connected (polygon-connected) to each other.

What is claimed is:

1. A sequential segment joining stator coil type electric rotating machine comprising:

a rotor having p pairs of poles (where p represents a natural number equal to or more than 2);

a stator core including a large number of slots each having s conductor accommodation positions (where s represents an even number equal to or more than 6) in its radial directions; and an armature winding including m-phase windings (where m represents an odd number equal to or more than 3) made by sequentially connecting a large number of U-shaped segments, each of said U-shaped segments being composed of a U-shaped head portion made to constitute a head-side coil end, a pair of in-slot conductor portions to be respectively accommodated in a pair of slots separated by a predetermined slot pitch from each other and a pair of protruding end portions made to protrude from said slots to constitute an end-side coil end, and tip portions of said pair of protruding end portions being respectively joined to tip portions of other protruding end portions adjacent thereto in the radial directions, wherein in-phase slot groups are provided for each pole, each including a plurality of in-phase slots forming said slots accommodating said in-slot conductor portions for making said phase windings in phase with each other, with said plurality of in-phase slots being continuously arranged in circumferential directions for each pole, and said conductor accommodation positions of each of said slots are divided into r (where r=s/t) conductor accommodation position sets each composed of the t (where t represents an integer) conductor accommodation positions continuously located in the radial directions, and said in-phase slots of said in-phase slot groups identical in order when viewed from one of the circumferential directions accommodate a partial coil in each of said conductor accommodation position sets, and said phase winding is constructed in a manner such that radial series coils formed by connecting said partial coils in said conductor accommodation position sets different from each other in series to each other through an inter-layer connection line, which are equal in number to said in-phase slots of said in-phase slot group, are connected in parallel with each other.

2. The machine according to claim 1, wherein combinations of said partial coils constituting said radial series coils of said phase winding are determined so that the total theoretical vector electromotive voltages of said radial series coils become equal to each other.

3. The machine according to claim 2, wherein, of said inter-layer connection lines for said radial series coils, said inter-layer connection lines located at the same position in a radial direction are separately placed in said in-phase slot groups different from each other in the circumferential directions so that said inter-layer connection lines located at the same position do not overlap with each other.

4. The machine according to claim 3, wherein said partial coils are constructed in a manner such that wave winding segments forming said segments passing through first and fourth layers of said conductor accommodation position set in the radial directions and lap winding segments forming said segments passing through second and third layers thereof are alternately connected to form first and second circling coils which substantially make a circuit, and said first and second circling coils are connected in series to shape-different wave winding segments serving as a last in-slot conductor portion of said first circling coil and a head in-slot conductor portion of said second circling coil, with said partial coils being accommodated in one in-phase slot of said in-phase slot group which has a predetermined order in the circumferential directions.

* * * * *